United States Patent
Dangoor et al.

(10) Patent No.: US 8,375,207 B2
(45) Date of Patent: Feb. 12, 2013

(54) METHOD AND APPARATUS FOR AUTHENTICATING A NETWORK DEVICE

(75) Inventors: Yehezkel Dangoor, Zoran (IL); Yuri Granovsky, Rehovot (IL)

(73) Assignee: Motorola Solutions, Inc., Schaumburg, IL (US)

( * ) Notice: Subject to any disclaimer, the term of this patent is extended or adjusted under 35 U.S.C. 154(b) by 358 days.

(21) Appl. No.: 12/674,303

(22) PCT Filed: Aug. 12, 2008

(86) PCT No.: PCT/US2008/072908
§ 371 (c)(1),
(2), (4) Date: Feb. 19, 2010

(87) PCT Pub. No.: WO2009/026049
PCT Pub. Date: Feb. 26, 2009

(65) Prior Publication Data
US 2012/0124373 A1    May 17, 2012

(30) Foreign Application Priority Data

Aug. 21, 2007  (GB) .................................. 0716239.9

(51) Int. Cl.
*H04L 9/32* (2006.01)
*G06F 15/16* (2006.01)
*H04K 1/00* (2006.01)
*H04L 9/08* (2006.01)

(52) U.S. Cl. ........ 713/168; 713/172; 380/270; 380/278; 709/229

(58) Field of Classification Search .......... 713/150–174, 713/182–186, 189–193, 202; 726/2–8; 380/44–47, 380/28–30, 255–286
See application file for complete search history.

(56) References Cited

U.S. PATENT DOCUMENTS

| 2005/0102244 | A1 | 5/2005 | Dickinson |
| 2005/0102529 | A1* | 5/2005 | Buddhikot et al. ........... 713/200 |
| 2005/0138355 | A1* | 6/2005 | Chen et al. ................... 713/155 |
| 2005/0251681 | A1* | 11/2005 | Robles et al. ................. 713/172 |
| 2006/0179322 | A1 | 8/2006 | Bennett |

(Continued)

FOREIGN PATENT DOCUMENTS

| KR | 1020060102527 |  | 9/2006 |
| KR | 1020060133699 | A | 12/2006 |

(Continued)

OTHER PUBLICATIONS

Sunone: Using SSL and TLS with Sun ONE Servers, 2003, Sun Microsystems, p. 1-20.*
GB Search Report Dated Nov. 22, 2007.
PCT International Search Report Dated Feb. 27, 2009.

*Primary Examiner* — Ashok Patel
*Assistant Examiner* — Evans Desrosiers
(74) *Attorney, Agent, or Firm* — Terri Hughes Smith; Barbara R. Doutre (57) ABSTRACT

A trust center for a wireless personal area network is arranged to perform authentication of communication devices joining the network. The trust center is operatively coupled to a security server, which is arranged to store communication device keys. The trust center is further arranged, upon a new communication device joining the network, to request from the security server a communication device key of the joining communication device for the purpose of authenticating the joining communication device.

26 Claims, 8 Drawing Sheets

U.S. PATENT DOCUMENTS

| | | |
|---|---|---|
| 2006/0291663 A1 | 12/2006 | Aissi |
| 2007/0123215 A1 | 5/2007 | Wang |
| 2008/0123605 A1 | 5/2008 | Cho |
| 2009/0052674 A1* | 2/2009 | Nishida et al. ................ 380/278 |

FOREIGN PATENT DOCUMENTS

| | | |
|---|---|---|
| KR | 1020070076063 A | 7/2007 |
| WO | WO03107602 A1 | 12/2003 |

* cited by examiner

FIG. 1
(PRIOR ART)

(PRIOR ART)

METHOD AND APPARATUS FOR AUTHENTICATING A NETWORK DEVICE

RELATED APPLICATIONS

This application is a National Stage filing under 35 USC §371 of Patent Cooperation Treaty international application having Serial No. PCT/US08/72908 (the "PCT international application") filed on Aug. 12, 2008. This application claims priority to the PCT international application and to prior Great Britain (GB) national application having Serial No. 0716239.9 filed on Aug. 21, 2007, the priority of which was also claimed in the PCT international application. Both the PCT international application and the GB national application are assigned to Motorola Solutions, Inc.

TECHNICAL FIELD

The technical field relates generally to a method and apparatus for authenticating a network device, and more particularly to a method and apparatus for authenticating a wireless personal area network device.

BACKGROUND

Personal Area Networks (PANs) are computer networks used for communication among personal computer devices, such as telephones, personal digital assistants (PDAs), etc., within a limited geographical area. In particular, a PAN enables communication between two or more communication devices within a range of a few meters. A PAN may be used for communication between the personal devices themselves (intrapersonal communication) or for connecting to a higher level network, for example the Internet, via an uplink.

PANs may be wired, for example via computer buses such as a Universal Serial Bus (USB), or wireless, for example utilising devices conforming to the ZigBee™ protocol, developed by the ZigBee Alliance (www.zigbee.org). The ZigBee protocol, in particular, is intended to provide a very low-cost, very low-power consumption, two-way wireless communication standard.

PANs may be used in a wide variety of situations, for example as part of home and building automation, industrial controls, personal computer (PC) peripherals, medical sensor applications, toys and games, etc. Typically, security measures are provided in order to maintain the integrity, etc. of the network and devices connected thereto. For example, the ZigBee protocol utilises keys, such as a link key, a network key and a master key, for encrypting messages transmitted between devices.

Figure 1:
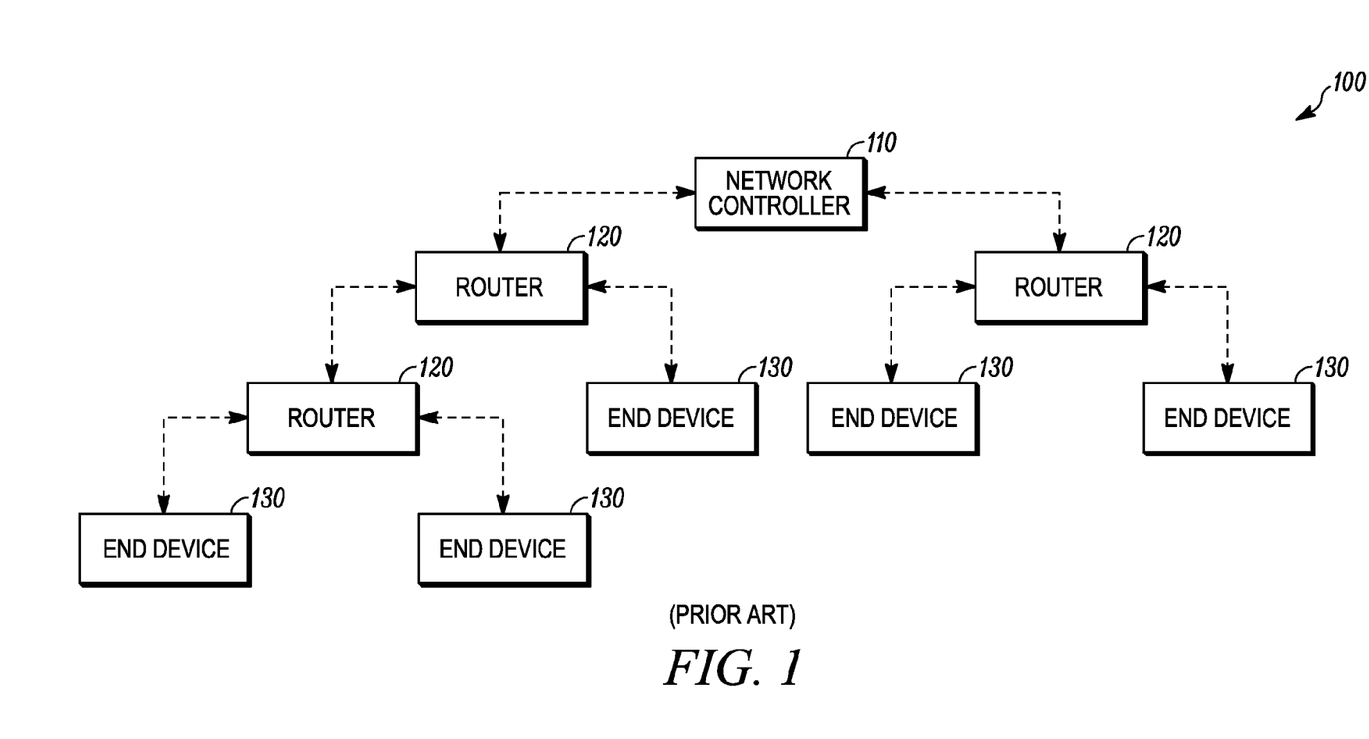
FIG. 1 illustrates an example of a known wireless personal area network.

FIG. 1 illustrates an example of a known ZigBee network 100. The network 100 comprises a network controller 110, routers 120 and end devices 130. The network controller 110, routers 120 and end devices 130 are wirelessly coupled to form, for the illustrated example, a tree network topology. Each ZigBee device, that is to say each of the network controller 110, routers 120 and end devices 130, comprises a radio transceiver 802.15.4 stack, as defined in the IEEE standard 802.15.4 (www.ieee.org), and a ZigBee networking stack. The ZigBee networking stack provides functions such as network joining/leaving, authentication, end-to-end data transferring and routing, etc. The network 100 further comprises a trust centre (not shown), which typically is provided by the network controller 110.

In order to provide security, session keys in the form of network keys and link keys, are used to encrypt/decrypt messages transmitted between devices. A network key is used for encrypting/decrypting broadcast traffic throughout the network, and as such is the same for all communication devices within the network. Link keys are used to encrypt/decrypt uni-cast messages between two communication devices, and, as such, the link key is sometimes referred to as a symmetric key known only by the two communication devices participating in the end-to-end communication.

A ZigBee network further uses a master key, which is a shared key used during the execution of a symmetric-key key establishment (SKKE) protocol, and is the basis for long-term security between two communication devices, and is used to generate link keys. A detailed explanation of the SKKE process may be found within the ZigBee specification, available from the ZigBee Alliance (www.zigbee.org).

A ZigBee communication device may be pre-configured with the master key, for example during manufacturing. A problem with this method of providing a device with the master key is that the master key must be pre-determined, and cannot subsequently be changed. Accordingly, this approach is limiting and inflexible.

Figure 2:
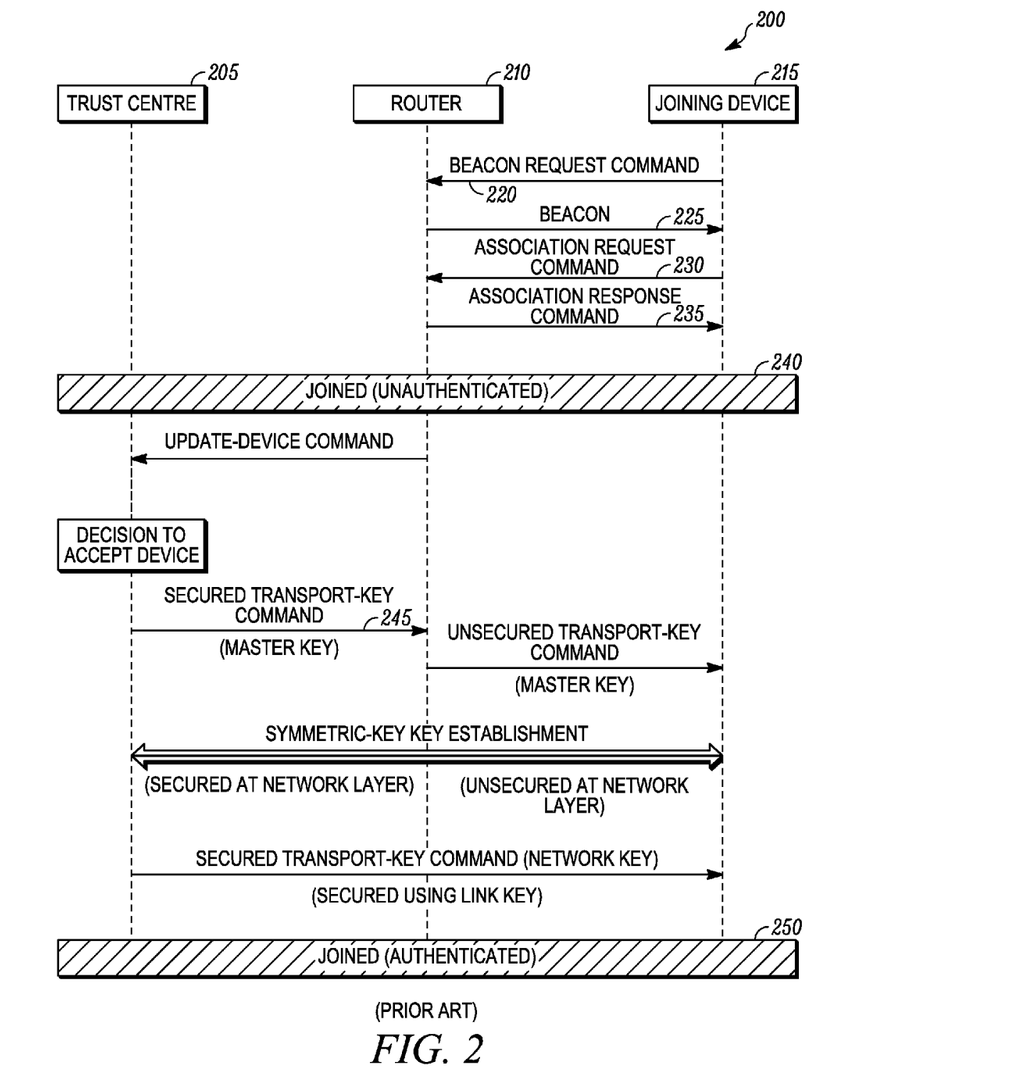
FIG. 2 illustrates an example of a message sequence chart for a device joining a personal area network, as is known in the art.

Alternatively, a ZigBee communication device may be provided with the master key by the trust centre upon joining a network. FIG. 2 illustrates an example of a message sequence chart for a communication device joining a ZigBee network, as is known in the art.

The joining device 215 begins the joining procedure by transmitting a beacon request command 220. Nearby routers 210 of ZigBee networks 200, upon receipt of the beacon request command 230, each transmits a beacon 225 comprising network layer specific information.

The joining device 215 then decides which network to join from the beacons transmitted by nearby routers 210, for example based on security attributes and the like identified within their respective beacons 225. Having decided which network to join, the joining device 215 sends an association request command 230 to be sent to the appropriate router. Upon receipt of the association request command 230 from the joining device 215, the router 210 then sends an association response command 235 back to the joining device 215.

Following the association response command 235, the joining device 215 is considered to have 'joined' the network, but is yet to be authenticated. The trust centre 205 of the network performs authentication. If the router 210 is the trust centre 205, authentication is performed immediately upon the new device joining the network. However, if the router 210 is not the trust centre 205, as is the case in the example illustrated in FIG. 2, the router 210 sends an update-device command to the trust centre 205.

Upon receipt of the update-device command (or where the router 210 is the trust centre 205, upon the completion of the joining procedure), the trust centre 205 decides whether to accept the communication device into the network. The decision to accept a new device may be based on various factors, such as whether the trust centre 205 is in a mode that allows new devices to join, whether the joining device 215 is eligible, for example as identified by an address of the joining device, to join the network, etc.

The authentication procedure depends on various factors, such as whether the joining device 215 has been pre-configured with a master key. If the joining device 215 has not been pre-configured with a master key, the trust centre 205 sends a master key to the joining device 215 using a transport-key command. As illustrated in FIG. 2, in the case where the router is not the trust centre 205, the transport-key command is secured between the trust centre 205 and the router 210, for example encrypted using the network key. However, in a case where the joining device 215 is not pre-configured with either a network key or a master key, the transport-key command must be sent from the router 210 to the joining device 215 unsecured.

Having conveyed the master key from the trust centre 205 to the joining device 215, via the transport-key command, the trust centre 205 and joining device 215 perform a symmetric-key key establishment (SKKE) procedure using the master key to establish a link key for the subsequent encryption of messages between the trust centre 205 and the joining device 215. Once again, and as illustrated in FIG. 2, whilst the SKKE commands are secured between the trust centre 205 and the router, they are unsecured between the router 210 and the joining device 215.

Once a link key has been established between the trust centre 205 and the joining device 215, the trust centre 205 sends the network key to the joining device 215, by way of a transport-key command 245 which is secured using the link key. In this way, the network key is securely transmitted not only between the trust centre 205 and the router 210, but also between the router 210 and the joining device 215.

Once the joining device 215 has received the network key, the joining device 215 is considered to be 'authenticated' 250.

A problem with this approach of remotely providing a Zigbee communication device 215 with the master key, is that the master key must be transmitted to the Zigbee communication device 215 in an unsecured manner. The ZigBee standard cites that implementers of a ZigBee network should note that transmission of an unsecured key represents a security risk and that if security is a concern, the keys should be pre-configured. However, as previously mentioned, pre-configuring of keys is limiting and inflexible.

In particular, the unsecured transmission of the master key may enable malevolent devices to obtain the master key, and thereby decrypt subsequent SKKE commands and transport-key commands. In this manner, a malevolent device would be able to obtain the network key and link keys, effectively nullifying the security of the network.

Another problem that has been identified with wireless PANs, such as a ZigBee network, is that such networks only utilise one-way authentication. For example, for the ZigBee network illustrated in FIG. 1 and FIG. 2, although the trust centre authenticates a device joining the network and, as a part of the decision to accept the device, provides some method of authenticating the device joining the network, the device joining the network does not perform any authentication of the trust centre, or the router with which it is communicating. Consequently, a rogue router may join a network, for example by obtaining network and master keys as described above, and by monitoring traffic within the network, mimic a trust centre for that network, and thereby cause disordering within the network. Disordering a ZigBee Network might be caused by any of the following:

Routing the traffic to a rogue (improper) PAN
Joining attacker devices
Disconnection of a ZigBee Application devices
Sending a device irrelevant or incorrect commands Thus, there exists a need for a method and apparatus for authenticating a network device, which addresses at least some of the shortcomings of past and present authentication techniques and/or mechanisms.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, there is provided a trust centre for a wireless personal area network arranged to perform authentication of devices joining the network. The trust centre is operatively coupled to a security server, which is arranged to store device keys. The trust centre is further arranged, upon a new device joining the network, to request from the security server a device key of the joining device for the purpose of authenticating the joining device.

The security server enables network keys, such as device keys, to be configured and stored without requiring resources and functionality of network devices, such as the trust centre, to be significantly increased. In particular, the security server enables a device key for each device within a network to be stored and accessed by the trust centre. In this manner, symmetric-key key establishment is not required to be reliant upon the use of a single master key, since the trust centre is able to use device keys to generate symmetric link keys to be used within symmetric-key key establishment.

Those skilled in the art will realize that the above recognized advantages and other advantages described herein are merely illustrative and are not meant to be a complete rendering of all of the advantages of the various embodiments.

Figure 3:
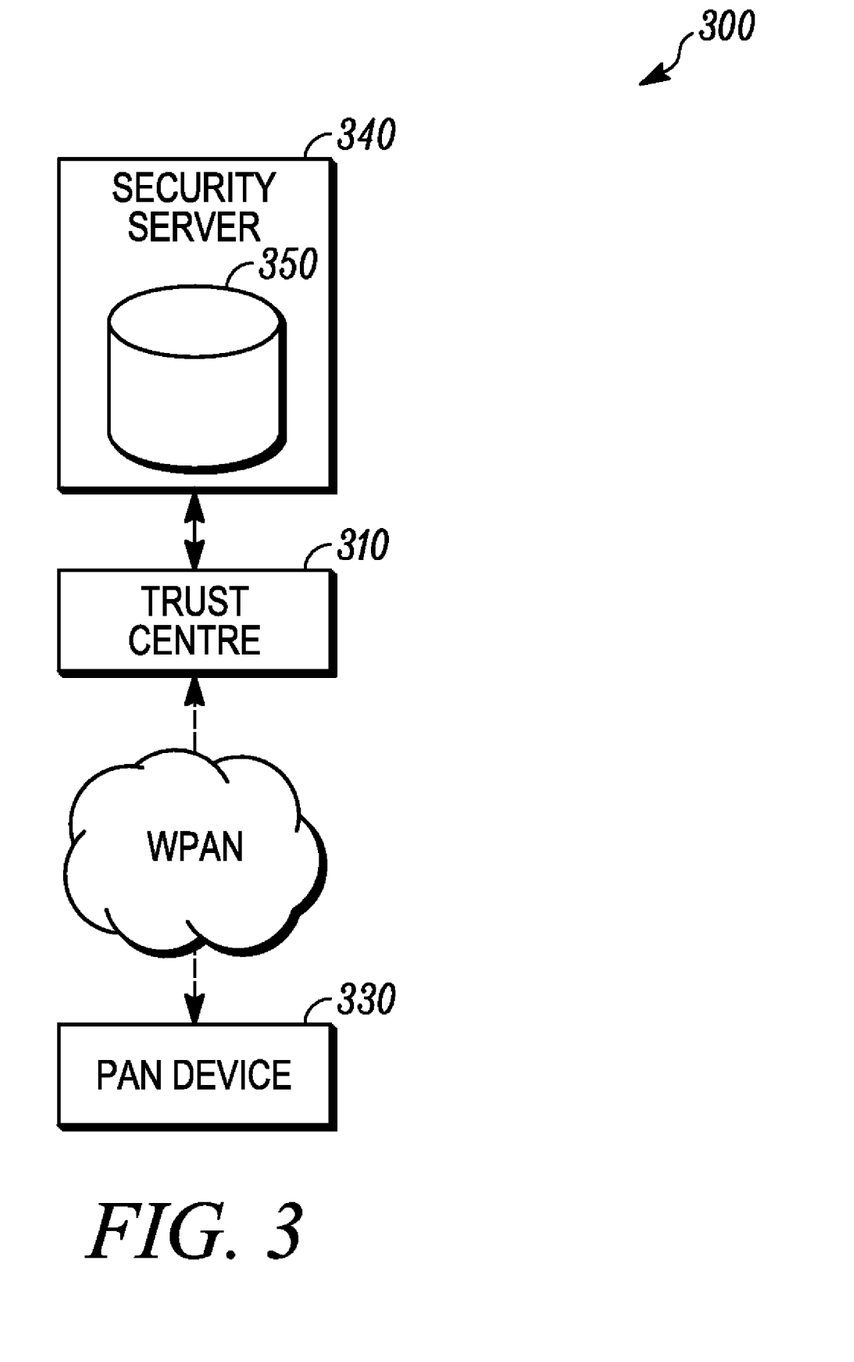
FIG. 3 illustrates a wireless personal are network in accordance with some embodiments of the invention.

Referring now to the drawings, and in particular FIG. 3, a Wireless Personal Area Network (PAN) in accordance with some embodiments is shown and indicated generally at 300. Those skilled in the art, however, will recognize and appreciate that the specifics of this example are merely illustrative of some embodiments and that the teachings set forth herein are applicable in a variety of alternative settings, examples of which are described herein. As such, other alternative implementations of a personal area network are contemplated and are within the scope of the various teachings described.

Turning now to FIG. 3, there is illustrated a Wireless Personal Area network (WPAN) 300, such as a ZigBee network. Also illustrated are a trust centre 310 and a network device 330, which are wirelessly coupled to, and form a part of the WPAN 300. The trust centre 310 is arranged to perform authentication of devices joining the network, and is further operatively coupled to a security server 340. For the illustrated embodiment, the security server 340 comprises a memory element 350, and is arranged to store device keys for Zigbee communication devices within the network, which for the illustrated embodiment includes the trust centre 310 and the, or each, network device 330. Such device keys may be in a form of a character string or a binary string.

Figure 4:
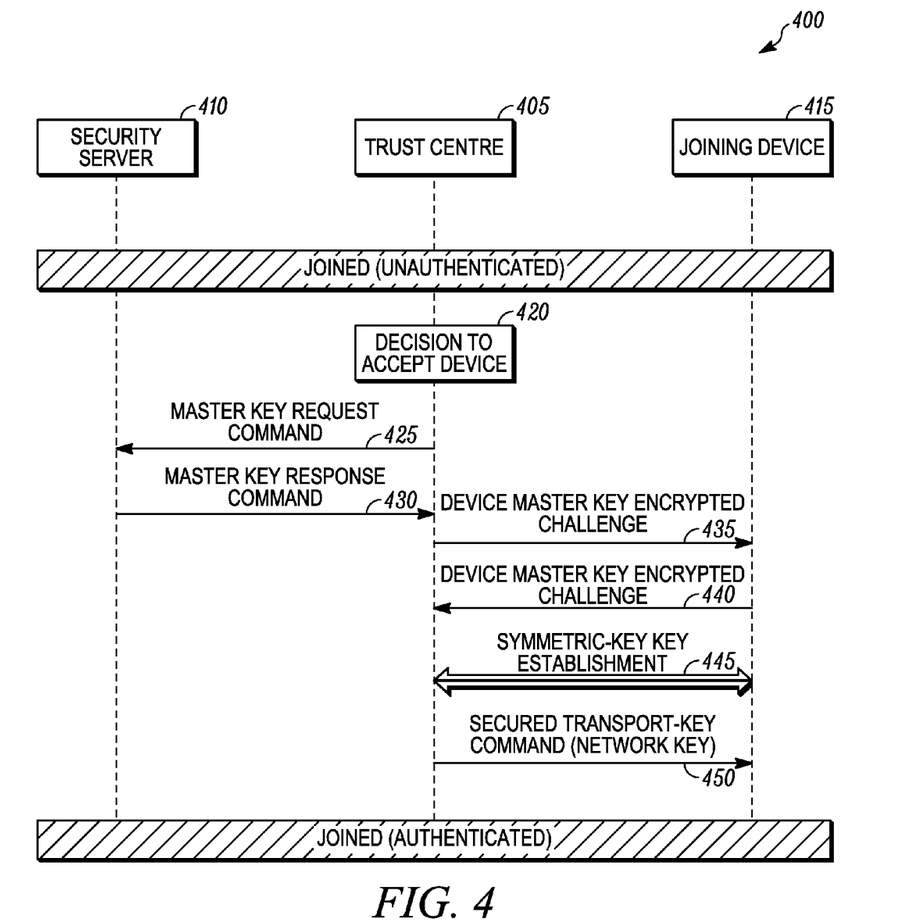
FIG. 4 illustrates an example of a message sequence chart for the authentication of a device joining a network in accordance with an embodiment of the invention.

Referring now to FIG. 4, there is illustrated an example of a message sequence chart 480 for the authentication of a communication device 415 joining a network, such as the WPAN 300 of FIG. 3, in accordance with an embodiment of the invention.

The message sequence chart 400 starts following the joining (unauthenticated) of a communication device 415 to the network. For example, if the joining communication device 415 joined the network by communicating directly with the trust centre 405, the trust centre 405 may initiate the authentication process following receipt of an association response command from the joining communication device 415. Alternatively, if the joining communication device 415 joined the network by communicating with a router within the network, the trust centre 405 may initiate the authentication process following receipt of an update-device command from the router. As will be appreciated by a skilled artisan, in a case where the joining communication device 415 communicates with a router, as opposed to directly with the trust centre 405, the messages passing between the trust centre 405 and the joining communication device 415 illustrated in FIG. 4 may be routed via the router.

The trust centre 405 begins the authentication process by deciding 420 whether to accept the joining communication device 415 into the network. The decision to accept the joining communication device 415 may be based on various factors, such as whether the trust centre 405 is in a mode that allows new devices to join, whether the joining communication device 415 is eligible, for example, as identified by an address of the joining communication device 415, to join the network, etc.

In a case where the trust centre 405 decides to accept the device, the trust centre 405 requests from the security server 418 a device key, which for the illustrated embodiment is in the form of sending a Master Key Request Command 425 to the security server 410. The Master Key Request Command 425 comprises information identifying the joining communication device 415, for example by way of a network address of the joining communication device 415.

The security server 410 responds to the Master Key Request Command 425 with a Master Key Response Command 430 comprising a device master key for the joining device. The Master Key Response Command 430 may further comprise a device master key for the trust centre 405. Alternatively, the trust centre 405 may retain its own master key, for example within a memory element thereof (not shown).

Upon receipt of the device master key for the joining communication device 415 from the security server 410, the trust centre 405 sends a challenge 435 to the joining communication device 415, the challenge 435 being encrypted with the device master key for the joining communication device 415.

By way of example, the trust centre 405 may issue a random challenge, hereinafter referred to as the trust centre challenge, encrypted with the joining device 415 master key using a cryptography algorithm, which the trust centre 405 sends in a form of a device master key encrypted challenge 435 to the joining device 415.

When the joining device 415 receives the device master key encrypted challenge 435, it extracts the trust centre challenge using the same cryptography algorithm. The joining device 415 then issues a random challenge, hereinafter referred to as the device challenge, and combines trust centre and device challenges, for example in a form of a concatenated string, which it encrypts and sends in a form of a device master key encrypted challenge 440 back to the trust centre 405

The trust centre 405 decrypts the device master key encrypted challenge 440 and splits the device master key encrypted challenge 440 into the trust centre and device challenges. If the sent and received trust centre challenges match, the joining device authentication is complete. In a case of a mismatch, the trust centre 405 takes action to remove the joining device 415 from the network. In a case of a match, the trust centre 405 sends the joining device 415 the security material for symmetric-key key establishment 445 with the device challenge extracted from the received device master key encrypted challenge 440.

Upon receipt of the security material for symmetric-key key establishment 445, the joining device 415 extracts the device challenge and compares it with the device challenge sent within the device master key encrypted challenge 440. If the received device challenge matches the device challenge previously sent within the device master key encrypted challenge 440, the joining device 415 continues the symmetric-key key establishment protocol 445, as described in the ZigBee specifications.

It is envisaged that the trust centre and device challenges each may comprise a character string or a binary string.

In this manner, mutual authentication is provided, whereby the trust centre is able to authenticate the joining communication device 415, and the joining communication device 415 is able to authenticate the trust centre 405. Thus, a rogue router mimicking the trust centre 405 may be identified by a joining communication device 415.

Once mutual authentication has been performed, the trust centre and the joining device perform symmetric-key key establishment 445, for example using the joining device master key, the trust centre master key, of another link key that may, for example, have been provided within either of the encrypted challenges.

Once the symmetric-key key establishment 445 has been performed, the trust centre 405 may send a secured transport-key command 450 comprising a network key. In this manner, the trust centre 405 is able to provide a network key, for example for encrypting/decrypting broadcast traffic throughout the network, etc., without the need to transmit a master key in an unsecured manner.

The security server 410 enables a plurality of device master keys to be stored without a need for the trust centre 405 to comprise significant memory resources, and as such enables a cost of the trust centre 405 to remain low.

For the embodiment illustrated in FIG. 4, the decision to accept a Zigbee communication device 415 joining the network is performed prior to the trust centre 405 sending the master key request command 425 to the security server 410. However, it will be appreciated that the sending and receiving of the master key request command 425 and master key response command 430 may form a part of the decision process for accepting a device into the network. For example, a part of the criteria for accepting a device into the network may be based on the communication device previously having been registered with the security server. In this manner, when a communication device registers with the security server 410, the security server 410 stores in memory a device identification, for example an address of the device, along with a master key for that communication device. The communication device identification and/or master key may be assigned to the communication device by the security server 410, or alternatively may be provided to the security server 410 by the communication device.

If the communication device has not previously registered with the security server 410, the security server will not recognise the identification of the communication device provided by the trust centre 405 in the master key request command 425, and consequently may respond with an error or null value in the master key response command 430. Upon receipt of the master key response command 430, the trust centre 405 is able to determine that the joining communication device 415 is not registered with the security server 410, by virtue of the error or null value, and is thus able to decide not to accept the joining communication device 415.

Figure 5:
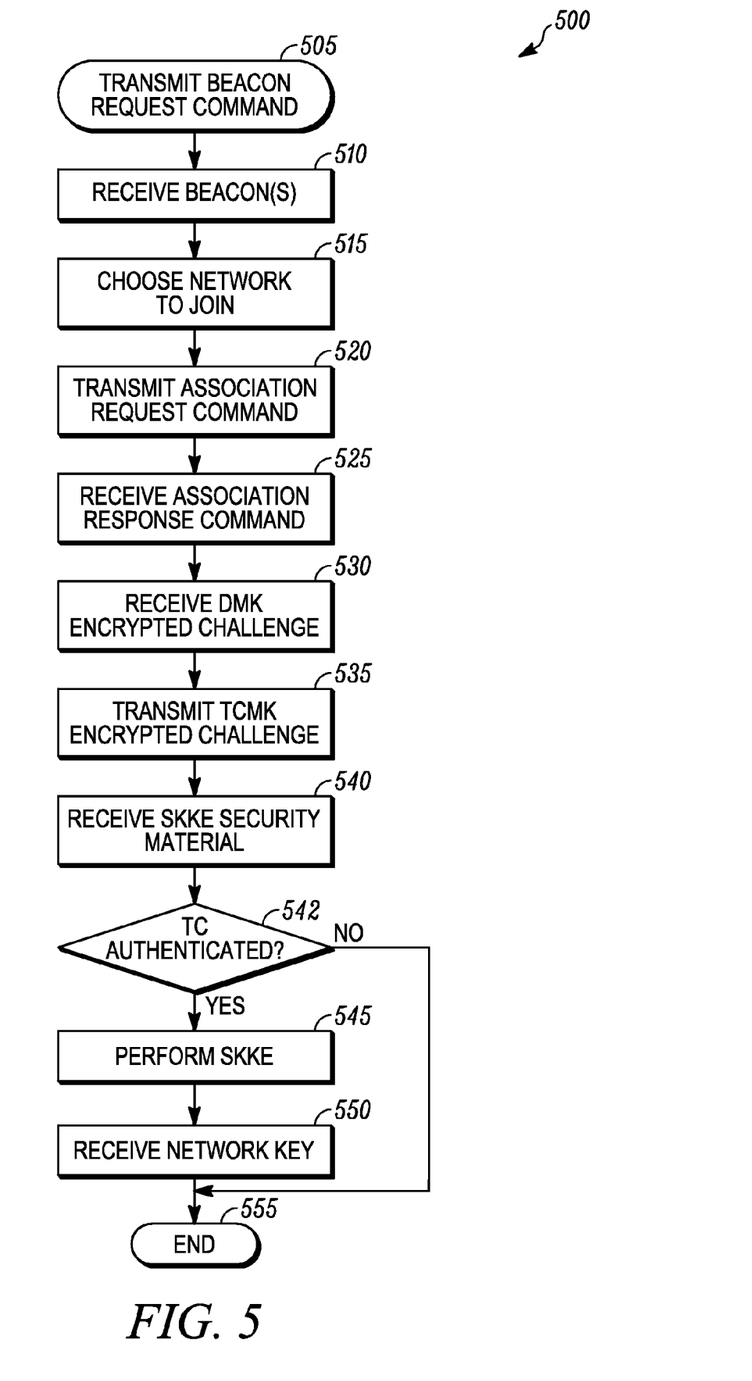
FIG. 5 illustrates a flowchart of a method for the joining and authentication of a device in accordance with an embodiment of the invention.

Referring now to FIG. 5 there is illustrated a flowchart 500 of a method for the joining and authentication of a communication device to a wireless personal area network, according to an embodiment of the invention. The method may be implemented by a wireless communication device, such as a network device 330 as illustrated in FIG. 3, and starts at step 505 with the communication device transmitting a beacon request command. The communication device subsequently receives one or more beacons comprising network layer specific information for respective networks, which have been transmitted by nearby routers in response to the beacon request command, in step 510.

Next, in step 515, the communication device chooses a network to attempt to join, based on information within the received beacon(s). Having chosen a network to attempt to join, the communication device transmits an association request command to a router that transmitted the beacon for the chosen network, in step 520.

The communication device subsequently receives a receive association response command, in step 525, in response to the association request command. Upon receipt of the association response command, the communication device is considered to have joined the network, but is yet to be authenticated.

Next, in step 530, the communication device receives a Device Master Key (DMK) encrypted challenge. The device then decrypts the challenge, using its own master key, in order to extract a trust centre challenge from a trust centre of a network with which the communication device is registered. The joining device then sends a Trust Centre Master Key (TCMK) encrypted challenge back to the trust centre comprising an encrypted, concatenated string comprising the trust centre challenge and a device challenge, in step 535.

Assuming the trust centre authenticates the communication device, the communicating device then receives, in step 540, security material for symmetric-key key establishment (SKKE), along with a device challenge with which to compare with the device challenge sent to the trust centre, and with which the communication device is able to authenticate the trust centre, in step 542.

If the trust centre is not authenticated, the method ends at step 555, and the communication device ends its attempt to join the network. However, if the trust centre is authenticated, the method moves to step 545.

In step 545, the communication device performs symmetric-key key establishment (SKKE). Having performed symmetric-key key establishment, the communication device then receives a network key from the trust centre, in step 550, for example within a secured transport-key command using a key established during the SKKE process.

The method then ends at step 555, with the communication device having successfully joined the network, authenticated the trust centre, been authenticated by the trust centre, and received a network key without the need for a master key to be transmitted in an unsecured manner.

Figure 6:
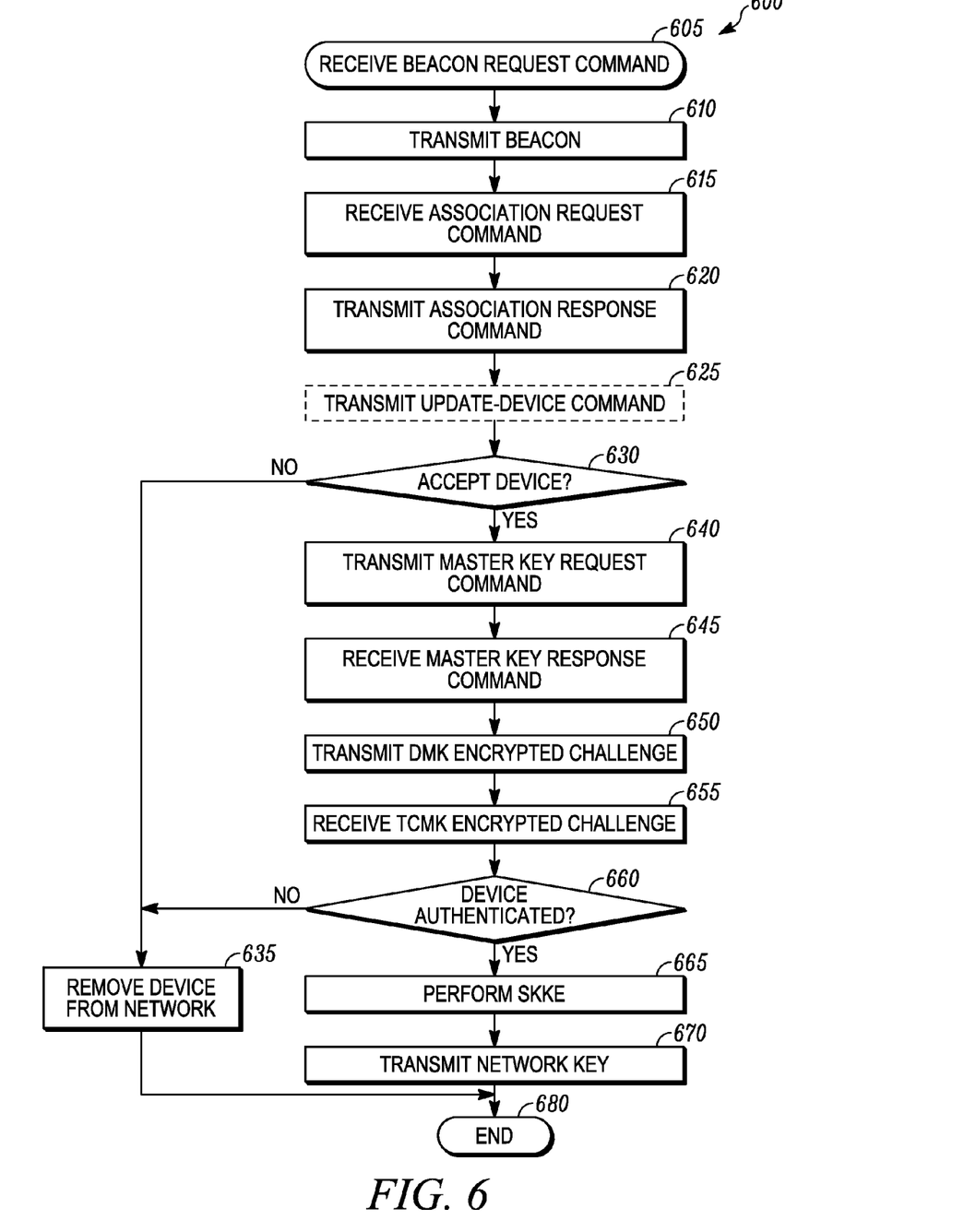
FIG. 6 illustrates a flowchart of a method for the joining and authentication of a device in accordance with an embodiment of the invention.

Referring now to FIG. 6 there is illustrated a flowchart 600 of a method for the joining and authentication of a communication device to a wireless personal area network according to a further embodiment. The method starts at step 605 with the receipt, for example by a router of the personal area network, of a beacon request command from a communication device attempting to join a network. Upon receipt of the beacon request command, the router responds by transmitting a beacon comprising network layer specific information and/or the like for the network of which the router forms a part, in step 610.

In a case where the network with which the router forms a part is chosen by the joining communication device, the router receives an association request command, in step 615. Next, in step 620, the router transmits an association response command back to the joining communication device, following which the joining communication device is considered to have joined the network, but is yet to be authenticated.

Steps 605 to 620 may be performed by a router with which the joining communication device is communicating. In a case where the router is not the trust centre, the next step, step 625, comprises the router transmitting an update-device command to the trust centre. In a case where the router is the trust centre for the network, step 625 is omitted.

In accordance with an embodiment of the invention, steps 630 to 675 are performed by the trust centre of the network, whether the trust centre is the router with which the joining communication device is communicating or not.

Step 630 comprises the trust centre determining whether to accept the communication device into the network or not. As previously mentioned, the decision to accept the joining device may be based on various factors, such as whether the trust centre is operating in a mode that allows new communication devices to join, whether the joining communication device is eligible, for example as identified by an address of the joining communication device, to join the network, etc.

If it is determined not to accept the joining communication device, the method moves to step 635, where the trust centre takes action to remove the communication device from the network. For example, the trust centre may send a remove communication device command to the router with which the joining communication device is communicating. The method then ends at step 680.

If it is determined to accept the joining communication device, the method moves to step 640, where the trust centre transmits a master key request command to a security server. The method then moves to step 645, with a receipt of a master key response from the security server, comprising a device master key for the joining communication device.

In an alternative embodiment, the transmission of a master key request command and the receipt of a master key response command form a part of the step of determining whether to accept the joining of the communication device into the network. For example, a part of the criteria for accepting a communication device into the network may be based on the communication device previously having been registered with the security server. In this manner, when a communication device registers with the security server, the security server stores in memory a communication device identification, for example an address of the communication device, along with a master key for that communication device. The device identification and/or master key may be assigned to the communication device by the security server, or alternatively may be provided to the security server by the communication device.

If the communication device has not previously registered with the security server, the security server will not recognise the identification of the communication device provided by the trust centre in the master key request command, and consequently may respond with an error or null value in the master key response command. Upon receipt of the master key response command, the trust centre is able to determine that the joining communication device is not registered with the security server, by virtue of the error or null value, and is thus able to decide whether or not to accept the joining device.

Upon receipt of the master key response command, in step 645, the method moves to step 650, where the trust centre transmits a trust centre challenge to the joining communication device, encrypted with the device master key for the joining communication device. The method then moves on to step 655, where the trust centre receives a device challenge from the joining communication device, encrypted with a trust centre master key.

Having received the trust centre master key encrypted challenge, the method moves to step 660, where the trust centre decrypts the device challenge and extracts a trust centre challenge with which it is able to compare the trust centre challenge sent to the communication device, and with which the trust centre authenticates the communication device. If the joining communication device is not successfully authenticated, the method moves to step 635, where the trust centre takes action to remove the communication device from the network. For example, the trust centre may send a remove communication device command to the router with which the joining communication device is communicating. The method then ends at step 680.

If the joining communication device is successfully authenticated, the method moves to step 665, wherein the trust centre initiates symmetric-key key establishment with the joining communication device by sending security material for SKKE, along with a device challenge extracted from the received trust centre master key encrypted challenge. Having completed the SKKE process, the method moves to step 670, where the trust centre sends a network key to the joining communication device, for example within a secured transport-key command using a key established during the SKKE process.

The method then moves to step 680, and ends.

Figure 7:
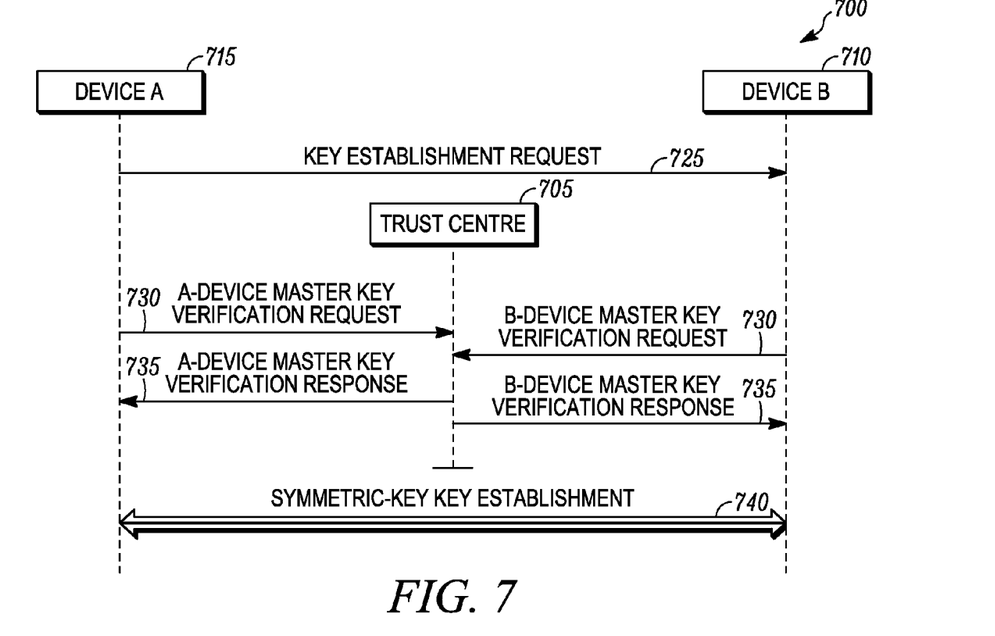
FIG. 7 illustrates an example of a messages sequence chart for establishing a link key in accordance with an embodiment of the invention.

Referring now to FIG. 7, there is illustrated an example of a message sequence chart 700 for establishing a link key between two network communication devices, in accordance with an embodiment of the invention.

A first device, device 'A' 715 initiates the establishment of a link key by sending a key establishment request 725 to a second device, device 'B' 710. The key establishment request 725 comprises, by way of example, at least one of:

(i) a full 64-bit unique address of the device to which the key establishment request is sent, which for the illustrated embodiment is device 'B' 710, (ii) the full 64-bit unique address of the trust centre 705 and (iii) key establishment method (symmetric-key key establishment).

Each of the communication devices, device 'A' 715 and device 'B' 710, then sends a device master key verification request 730, to the trust centre 705. The trust centre 705 then sends a device master key verification response 735 to each of device 'A' 715 and device 'B' 710. The device master key verification request 730 from device 'A' 715 may comprise, by way of example, at least one of:

(i) The master key of device 'A' 715 and (ii) A full 64-bit unique address of device 'B' 710, encrypted with the trust centre 705 link key.

It is envisaged that the trust centre link key may be a symmetric communication key associated with both the trust centre 705 and device 'A' 715.

Conversely, the device master key verification request 730 from device 'B' 710 may comprise only the master key of the device 'B' 710 encrypted with a trust centre 705 link key Upon receiving encrypted master keys from both device 'A' 715 and device 'B' 710, the trust centre 705 decrypts them and verifies that the devices have previously been authenticated, for example by way of retrieving information from a security server.

In a case where device 'A' 715 and device 'B' 710 have been previously authenticated, the trust centre 705 sends to each device a link key encrypted by appropriated trust centre link keys, previously established when each device joined the network. The trust centre 705 is aware of the communication peers since it received the 'B' device address within the master key verification request 730 from device 'A' 715.

Having received the device master key verification responses, device 'A' 715 and device 'B' 710 perform symmetric-key key establishment 740 in order to establish a link key for encrypting/decrypting messages transmitted between the two devices.

Figure 8:
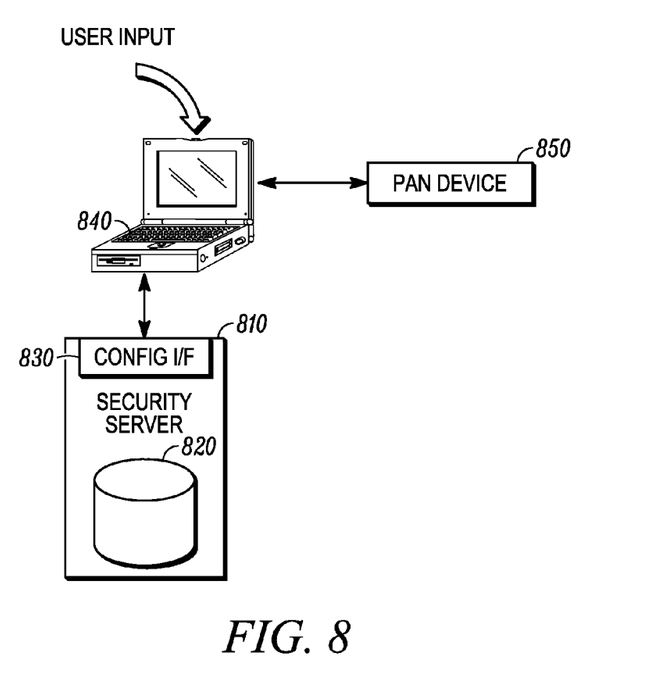
FIG. 8 illustrates a security server in accordance with an embodiment of the invention.

Referring now to FIG. 8, there is illustrated a security server 810 in accordance with an embodiment of the invention. The security server 810 comprises a memory element 820 and a configuration interface 830. The configuration interface enables device master keys to be configured and stored within the memory element 820. For the embodiment illustrated in FIG. 8, the configuration interface 830 is arranged to be operatively coupled to a personal computing device 840, for example by way of a universal serial bus (USB). Alternatively, the configuration interface 830 may be arranged to be operatively coupled to the personal computing device 840 by way of a wireless connection, for example via a Bluetooth™ connection, a Wireless Local Area Network (WLAN), or an infrared connection, such as an IrDA connection. The personal computing device 840 may be in the form of a personal computer, personal digital assistant (PDA), cellular telephone, etc.

In this manner, device configuration information may be provided to the security server 810 from the personal computing device 840, via the configuration interface, and stored in memory element 820. Network communication devices, such as Personal Area Network (PAN) device 850, may be registered with the personal computing device 840, and assigned a device master key and/or network address etc. Alternatively, in a case where a network communication device 850 has been preconfigured with a device master key and/or network address etc, upon registration with the personal computing device 840, the network communication device 850 provides its device master key and/or network address to the personal computing device 840. Following registration of the network communication device 850 with the personal computing device 840, the configuration information for the network communication device 850, for example the network address and/or device master key for the network device 850, is/are downloaded to the security server 810, via the configuration interface 830. In this manner, the network communication device 850 becomes registered with the network.

Figure 9:
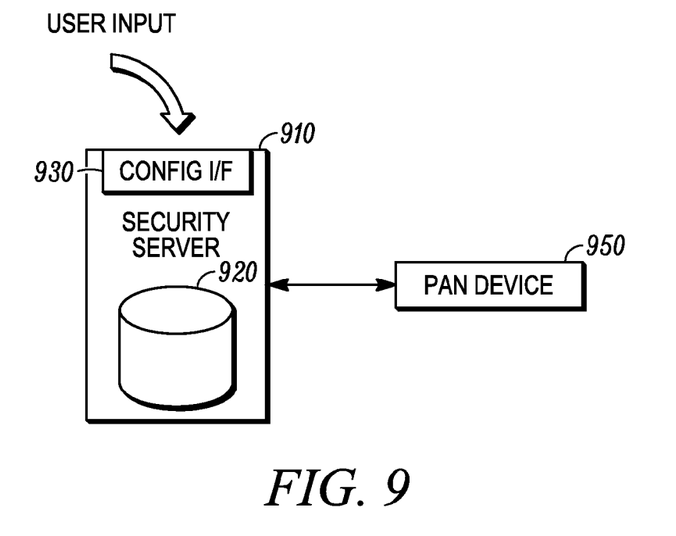
FIG. 9 illustrates a security server in accordance with an alternative embodiment of the invention.

Referring now to FIG. 9, there is illustrated a security server 910 in accordance with an alternative embodiment of the invention. For the embodiment illustrated in FIG. 9, a network communication device 950 registers directly with the security server 910. In this manner, the network communication device 950 may be assigned a device master key and/or network address etc. Alternatively, a the case where a network communication device 950 has been preconfigured with a device master key and/or network address etc, upon registration with the security server 910, the network device 950 provides its device master key and/or network address to the security server 910. The security server 910 then stores the configuration information for the network communication device, for example the device master key and network address of the communication device, in memory element 920.

For the embodiment illustrated in FIG. 9, the security server 910 further comprises a configuration interface 930, which comprises a user interface, for example a display and/or keypad or the like. In this manner, a user is able to manually provide and/or manage configuration information for network communication devices via the configuration interface 930. It is envisaged that the security server 910 may be located on a generic computing device, such as a personal computer or the like, in a form of a programme application running thereon. Alternatively, the security server 910 may be provided on a dedicated electronic device, or other suitable device.

During the registration process of a network communication device, whereby the device master key etc. are assigned to/received from a network communication device, the network device may be connected to the personal computer 840, for the embodiment illustrated in FIG. 8, or the security server 910, for the embodiment illustrated in FIG. 9, via a wired connection, such as a USB connection. However, low cost wireless personal area network devices may not comprise means for a wired connection. Consequently a wireless connection may be used, for example a 'one-hop', i.e. direct connection, such as a 802.15.4 connection, as defined in the IEEE standard 802.15.4 (www.ieee.org). For security reasons, the range for wireless registration may be limited to, for example, one meter.

Figure 10:
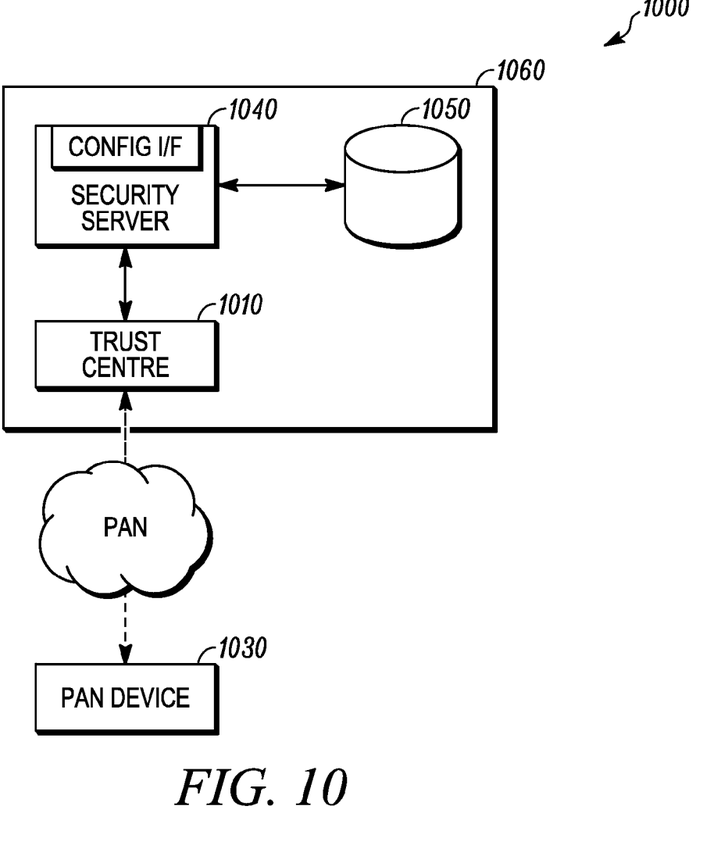
FIG. 10 illustrates a wireless personal area network in accordance with an alternative embodiment of the invention.

Referring now to FIG. 10, there is illustrated a wireless personal area network 1000 according an alternative embodiment of the invention. Also illustrated are a trust centre 1010 and a network communication device 1030, which are wirelessly coupled to, and form a part of the wireless personal area network 1000. The trust centre is operatively coupled to a security server 1040. The security server 1040 is coupled to a discrete memory element 1050.

For the embodiment illustrated in FIG. 10, the trust centre 1010 and security server 1040 form a part of a network manager 1060. The network manager 1060 may comprise a personal computing device, such as a personal computer, personal digital assistant (PDA), cellular telephone, etc., whereby the security server 1040 and trust centre 1010 are each, or collectively, in a form of an application programme running thereon. Alternatively, the network manager 1060 may comprise a dedicated electronic device.

It will be understood that the aforementioned architecture, communication devices, and methods for authentication and establishing a communication link, embodying the inventive concept described above, tend to provide at least one or more of the following advantages:

(i) Each device has its own unique master key;
(ii) Device master keys are configured with the trust centre/security server prior to the device joining the network in a secure manner;
(iii) Device master keys are not required to be factory preconfigured;
(iv) Mutual authentication is supported, whereby upon joining a network, a device is able to authenticate the trust centre as well as the trust centre being able to authenticate the device;
(v) The provision of security management tools by the security server for devices that do not comprise a user interface; and
(vi) Increased robustness of a secure PAN, without an increase in the cost of devices.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms 'comprises,' 'comprising,' 'has', 'having,' 'includes', 'including,' 'contains', 'containing' or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by 'comprises . . . a', 'has . . . a', 'includes . . . a', 'contains . . . a' does not, without more constraints, preclude the existence of additional identical elements in the process, method, article, or apparatus that comprises, has, includes, contains the element. The terms 'a' and 'an' are defined as one or more unless explicitly stated otherwise herein. The terms 'substantially', 'essentially', 'approximately', 'about' or any other version thereof, are defined as being close to as understood by one of ordinary skill in the art. The term 'coupled' as used herein is defined as connected, although not necessarily directly and not necessarily mechanically. A device or structure that is 'configured' in a certain way is configured in at least that way, but may also be configured in ways that are not listed.

It will be appreciated that some embodiments may be comprised of one or more generic or specialized processors (or 'processing devices') such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for authenticating a network device described herein. The non-processor circuits may include, but are not limited to, a radio receiver, a radio transmitter, signal drivers, clock circuits, power source circuits, and user input devices. As such, these functions may be interpreted as steps of a method to perform the authentication of a network device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a 'processing device' for purposes of the foregoing discussion and claim language.

Moreover, an embodiment can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A trust centre for a wireless personal area network arranged to perform authentication of communication devices joining the wireless personal area network;

the trust centre being operatively coupled to a security server, which is arranged to store a plurality of communication device keys associated with communication devices known to the network;

the trust centre being further arranged:

upon a new communication device joining the wireless personal area network, to request from the security server a communication device key associated with the joining communication device for a purpose of authenticating the joining communication device;

to perform mutual authentication between the trust centre and the joining communication device by sending to the joining communication device a challenge encrypted with the communication device key for the joining communication device and to receive from the joining communication device a further encrypted challenge sent in response to the encrypted challenge from the trust centre;

to generate a link key for use by an authenticated device that has performed the mutual authentication with the trust centre and for which a mutual link with another authenticated device has been requested, wherein the trust centre verifies that the request originates from a previously authenticated device, and upon verification sends a verification response to the authenticated device; and to send the link key in encrypted form to the authenticated device.

2. The trust centre of claim 1 wherein the trust centre requests a communication device master key from the security server by sending a Master Key Request Command comprising information that identifies the joining communication device.

3. The trust centre of claim 2 wherein the Master Key Request Command comprises an address of the joining communication device.

4. The trust centre of claim 1 wherein the encrypted challenge received from the joining communication device is encrypted with a device key of the trust centre.

5. The trust centre of claim 1 wherein the trust centre is arranged to perform symmetric-key key establishment with the joining communication device, upon authentication of the joining communication device.

6. The trust centre of claim 5 wherein the trust centre is further arranged to send a network key to the joining communication device after having performed symmetric-key key establishment.

7. The trust centre of claim 1 wherein the verification request comprises a device master key of the communication device, and is encrypted with a trust centre link key.

8. The trust centre of claim 7 wherein the verification request further comprises an address of a second communication device.

9. The trust centre of claim 8 wherein the verification request is encrypted with symmetric communication key associated with both the trust centre and the communication device.

10. The trust centre of claim 1 wherein the link key provided within the verification response is for symmetric-key key establishment between the communication device and a further communication device, and is encrypted with a trust centre link key.

11. The trust centre of claim 1, wherein the security server being arranged to store a plurality of communication device keys, and to receive a request for a communication device key from the trust centre;

the security server being further arranged to receive communication device configuration information comprising a device key for that communication device.

12. The security server of claim 11 wherein the configuration information further comprises a network address for that communication device.

13. The security server of claim 11 wherein the security server comprises logic for receiving a request for a communication device key from the trust centre in a form of a Master Key Request Command comprising information identifying the communication device.

14. The security server of claim 13 wherein the Master Key Request Command comprises a network address of the joining communication device.

15. The security server of claim 13 wherein the security server responds to requests for communication device keys from the trust centre in a form of a Master Key Response Command comprising a master key for the communication device.

16. The security server of claim 11 wherein the security server comprises a configuration interface via which the security server receives device configuration information.

17. The security server of claim 16 wherein the configuration interface is arranged to be operatively coupled to a personal computing device by way of a universal serial bus or a wireless connection.

18. The security server of claim 16 wherein the configuration interface comprises a user interface via which a user is able to manually provide or manage configuration information for network devices.

19. The security server of claim 11 wherein the security server comprises a memory element arranged to store configuration information comprising communication device keys for registered communication devices.

20. The security server of claim 11 wherein, upon registration of a communication device with the security server, the security server assigns a communication device key to that communication device.

21. The security server of claim 20 wherein, upon registration of a communication device with the security server, the communication device provides a communication device key for that communication device to the security server.

22. A method of operation for use in a wireless personal area network comprising:
joining, by a plurality of communication devices, the wireless personal area network and requesting authentication from a trust centre of the network;
requesting, by the trust centre, from a security server a communication device key associated with at least one of the plurality of joining communication devices;
performing, by the trust centre and the at least one of the plurality of joining communication devices, mutual authentication by the trust centre sending to the at least one of the plurality of joining communication devices a challenge encrypted with the communication device key and receiving from the at least one of the plurality of joining communication devices a further encrypted challenge sent in response to the encrypted challenge from the trust centre;
the trust centre generating a link key for use by an authenticated device that has performed the mutual authentication with the trust centre and for which a mutual link with another authenticated device has been requested, wherein the trust centre verifies that the request originates from a previously authenticated device, and upon verification sends a verification response to the authenticated device; and
the trust centre sending the link key in encrypted form to the authenticated device.

23. A wireless personal area network comprising:
each of a plurality of communication devices joining the wireless personal area network and requesting authentication from a trust centre of the network;
the trust centre requesting from a security server a device key associated with each joining device;
the trust centre and each joining device performing mutual authentication by the trust centre sending to the joining device a challenge encrypted with the device key and receiving from the joining device a further encrypted challenge sent in response to the encrypted challenge from the trust centre;
the trust centre generating a link key for use by an authenticated device that has performed mutual authentication with the trust centre and for which a mutual link with another authenticated device has been requested, wherein the trust centre verifies authentication and upon verification sends a verification response to the authenticated device; and
the trust centre sending the link key in encrypted form to the authenticated device.

24. The wireless personal area network of claim 23 wherein the trust centre requests a communication device key from the security server by sending a Master Key Request Command comprising information that identifies the joining communication device.

25. The wireless personal area network of claim 23 wherein the trust centre receives from a joining communication device a challenge that is encrypted with a communication device key of the trust centre.

26. The wireless personal area network of claim 23 wherein the trust centre receives from the joining communication device an encrypted challenge of the joining communication device concatenated with the encrypted challenge sent by the trust centre.

* * * * *